INVENTORS
FRANK N. KERSEY
JOHN L. KERSEY, JR.
TRENT H. KEMP

BY *Ralph J. Bassett*

ATTORNEY

June 20, 1967 F. N. KERSEY ETAL 3,326,396
HAULAGE UNITS
Filed April 21, 1965 6 Sheets-Sheet 2

INVENTORS
FRANK N. KERSEY
JOHN L. KERSEY, JR.
TRENT H. KEMP
BY Ralph T. Bassett
ATTORNEY

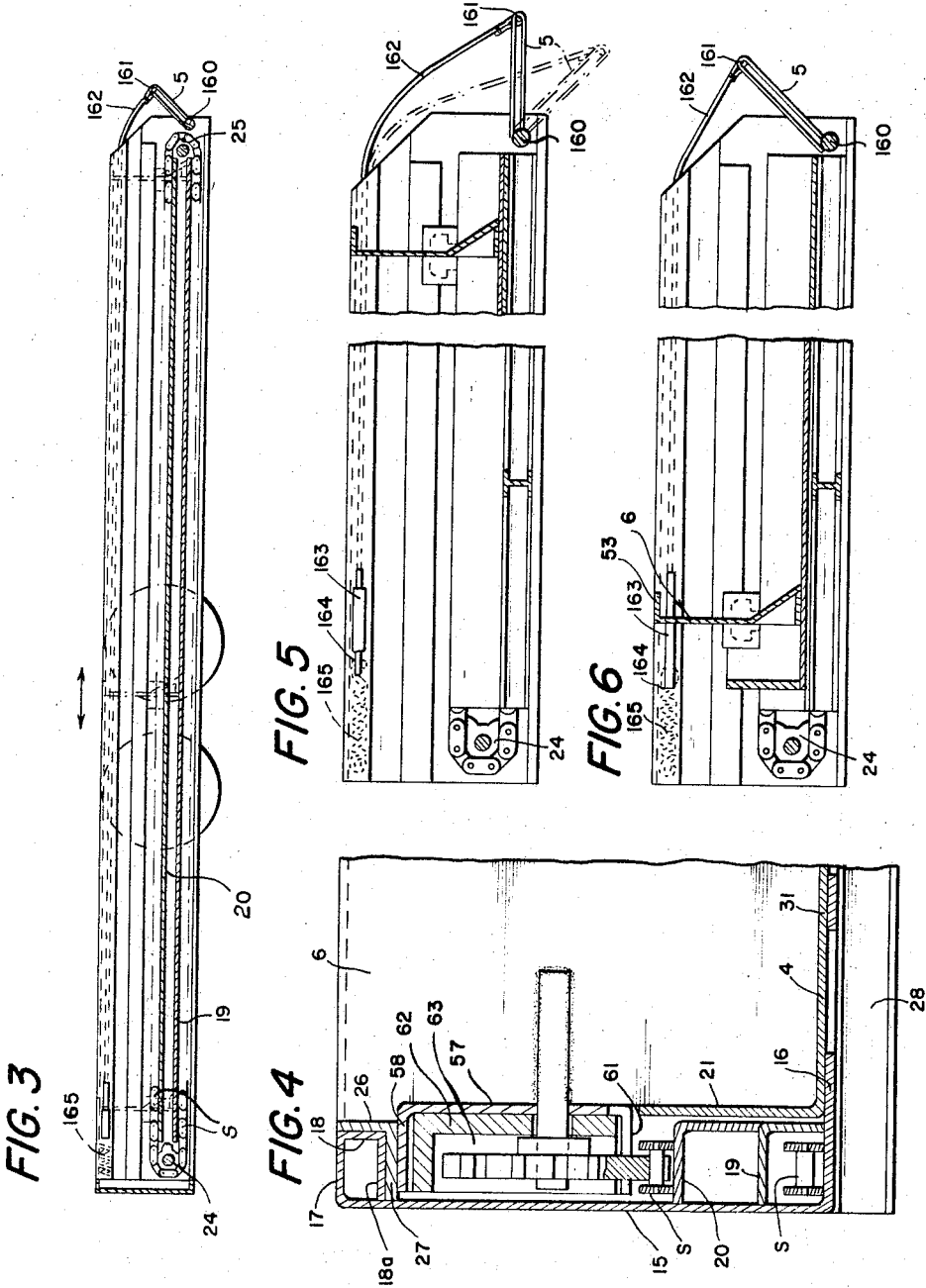

INVENTORS
FRANK N. KERSEY
JOHN L. KERSEY, JR.
TRENT H. KEMP
BY Ralph J. Bassett
ATTORNEY June 20, 1967     F. N. KERSEY ETAL     3,326,396
HAULAGE UNITS Filed April 21, 1965     6 Sheets-Sheet 5

INVENTORS
FRANK N. KERSEY
JOHN L. KERSEY, JR.
TRENT H. KEMP
BY Ralph J. Bassett
ATTORNEY

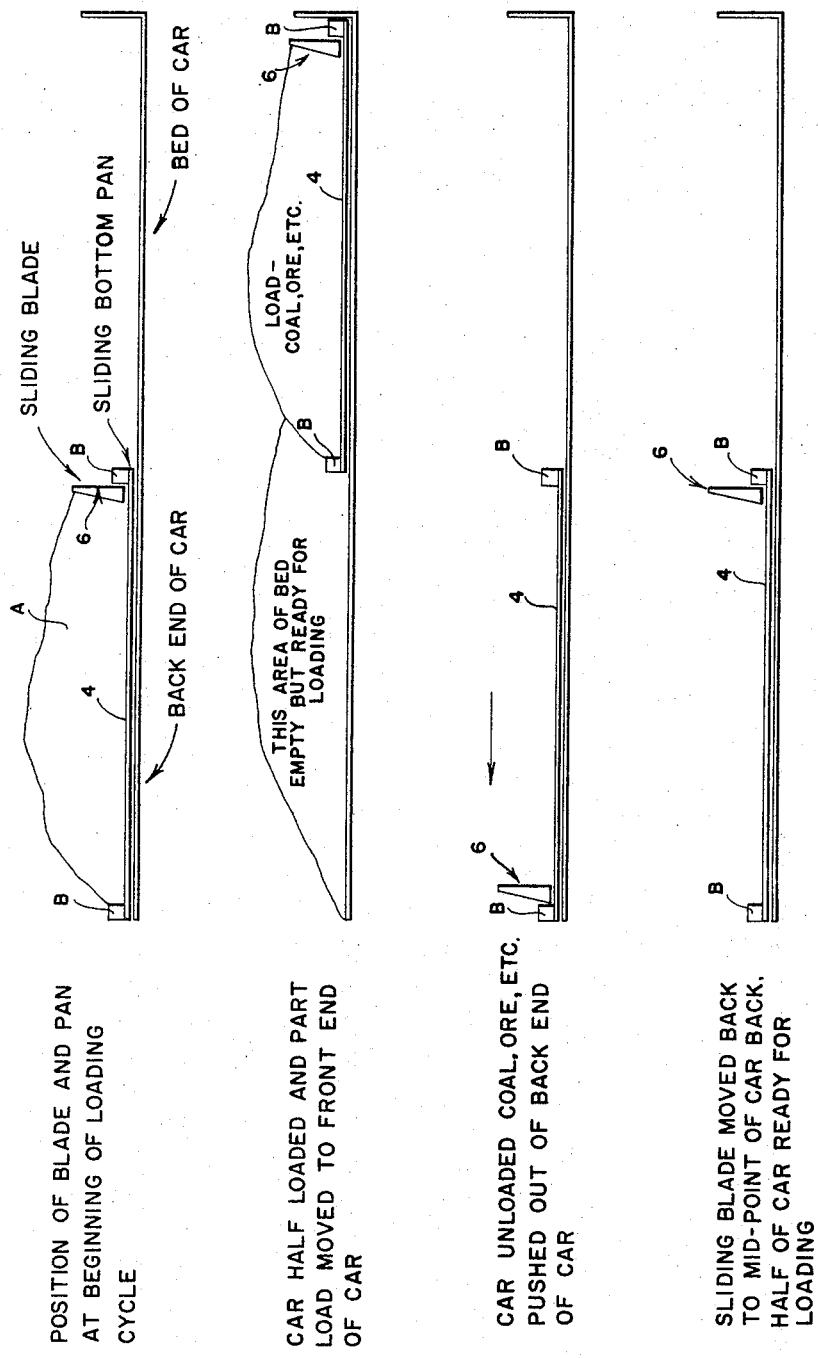

United States Patent Office 3,326,396
Patented June 20, 1967

3,326,396
HAULAGE UNITS
Frank N. Kersey, John L. Kersey, Jr., and Trent H. Kemp, Bluefield, Va., assignors to "Automatic" Sprinkler Corporation of America, Youngstown, Ohio, a corporation of Ohio
Filed Apr. 21, 1965, Ser. No. 449,840
16 Claims. (Cl. 214—83.22)

This invention relates to improvements in a haulage unit.

The object of this invention is to provide a car embodying a power operated load-carrying floor section or deck which can be shifted from the front end of the car structure to the rear end of the car structure to facilitate the loading and unloading of the full length of the car without special lading handling equipment.

One of the objects of the invention is to construct a car particularly for handling coal, ore and the like in which the floor or deck is built in two sections, the discharge end of the car having a fixed section and the forward end of the car having a traveling section which can be moved to the rear of the car for initial loading and subsequent movement to the front of the car in loaded condition.

Another object of the invention is to provide a car of the type described in which the front end of the car is formed with a traveling blade or end wall which is moved by power to carry the lading across the entire length of the car for discharge at the rear end of the car structure.

Another feature of the instant invention is to provide a car with a sliding front floor portion which is coupled to a power operated sliding blade or end wall lading removal assembly, whereby the sliding blade or lading removal assembly can be used to sweep the entire car of its lading and during a portion of its travel shift the front sliding portion of the floor to the rear end of the assembly for convenient loading, the blade assembly including coupling means with the sliding floor portion to not only move it rearward to a lading-receiving position but also being adapted to move the floor in its loaded position to the front end of the car.

Another feature of the invention is the provision of means for actuating a hinged rear end gate by operation of the sliding blade or front end wall structure so that upon the return of the sliding blade or end wall to its position at the front end of the car, the rear end gate will be moved to a generally upright position for retaining the lading which may be contained within the car body.

More specifically the invention embodies a frame having a power assembly at the front end coupled by suitable power transmitting means to a pair of endless chains carried in the sidewalls of the car, the chains being constructed for interengagement with a sliding blade or front wall structure, whereby this sliding blade or front wall structure can be shifted by power to sweep the lading from the car body and to subsequently move a forward section of the car floor forward for receiving lading and for returning the same to the front end of the car.

One of the main objects of the invention is a novel coupling assembly between the sliding blade or traveling front wall structure and the driven endless chain positioned in the sidewalls of the car, whereby the travel of the chains will provide fore and aft movement of the sliding blade or front wall to its desired position essential to the loading and unloading of the haulage unit.

More specifically the present invention includes sprockets mounted at the ends of the sliding blade, which sprockets mesh with the endless driven chains in the sidewalls of the car and are associated with automatic locking and releasing means, whereby the sprockets may be locked for movement with the endless chains or may be released for free rotation and thus provide a stationary position of the sliding blade or front wall during continued movement of the driven endless chains.

It is a further object of the invention to provide a sprocket mounting assembly at the ends of the sliding blade or traveling front wall, whereby the sprocket mounting assembly can be shifted for locking or releasing the sprocket wheels and additional means for securing the parts of the unit sections to facilitate the travel of the unit without displacement.

These and other objects of the invention will more clearly hereinafter appear by reference to the accompanying drawings forming a part of the instant specification and wherein like characters of reference designate corresponding parts throughout the several views, in which:

FIG. 3 is a longitudinal section on line 3—3 of FIG. 2;

FIG. 4 is a transverse section on line 4—4 of FIG. 2;

FIG. 5 is an enlarged vertical section showing the unloading blade in its discharge position;

FIG. 6 is a view, similar to FIG. 5, showing the unloading blade in its rear position;

FIG. 13 is a diagrammatic illustration of the car body showing the movable floor section and sliding blade in various positions of loading and unloading.

Figure 12:
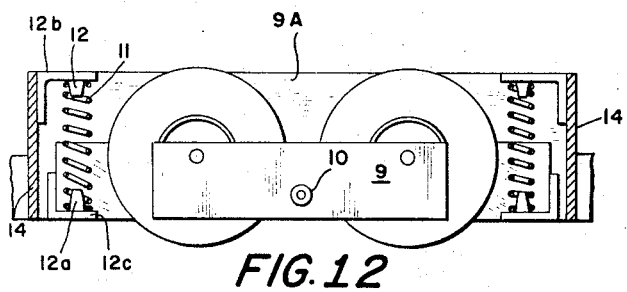
FIG. 12 is a section on line 12—12 of FIG. 2.

In the present drawings a car structure is shown including sidewalls 1 and 2, a rear fixed floor section 3, a front sliding floor section 4, a hinged tailgate 5, and a front sliding blade 6 which in normal loaded position forms the front wall of the car assembly. As seen from FIG. 2, the car is rectangular in form and is mounted on medially arranged pivoted pairs of wheels 7 and 7a, each wheel of each pair being carried on an axle 8 mounted between spaced plates 9 and 9a pivotally supported on main axles 10. By supporting the wheels 7 and 7a in the manner shown, the wheel assemblies readily follow irregularities or indulations in the roadway and any shock due to sudden obstructions will be absorbed by springs 11 carried on pins 12 and 12a on spaced plates 12b and 12c (FIG. 12) at the end of the wheel housing assembly 14 fixed to each side of the car. The inner wheel mounting plates 9a support the lower spring brackets 12c and upon oscillation of their pivotal support on the axles 10 cooperate with the coil springs 11 to provide a cushioning of the wheel assemblies and haulage unit.

Figure 1:
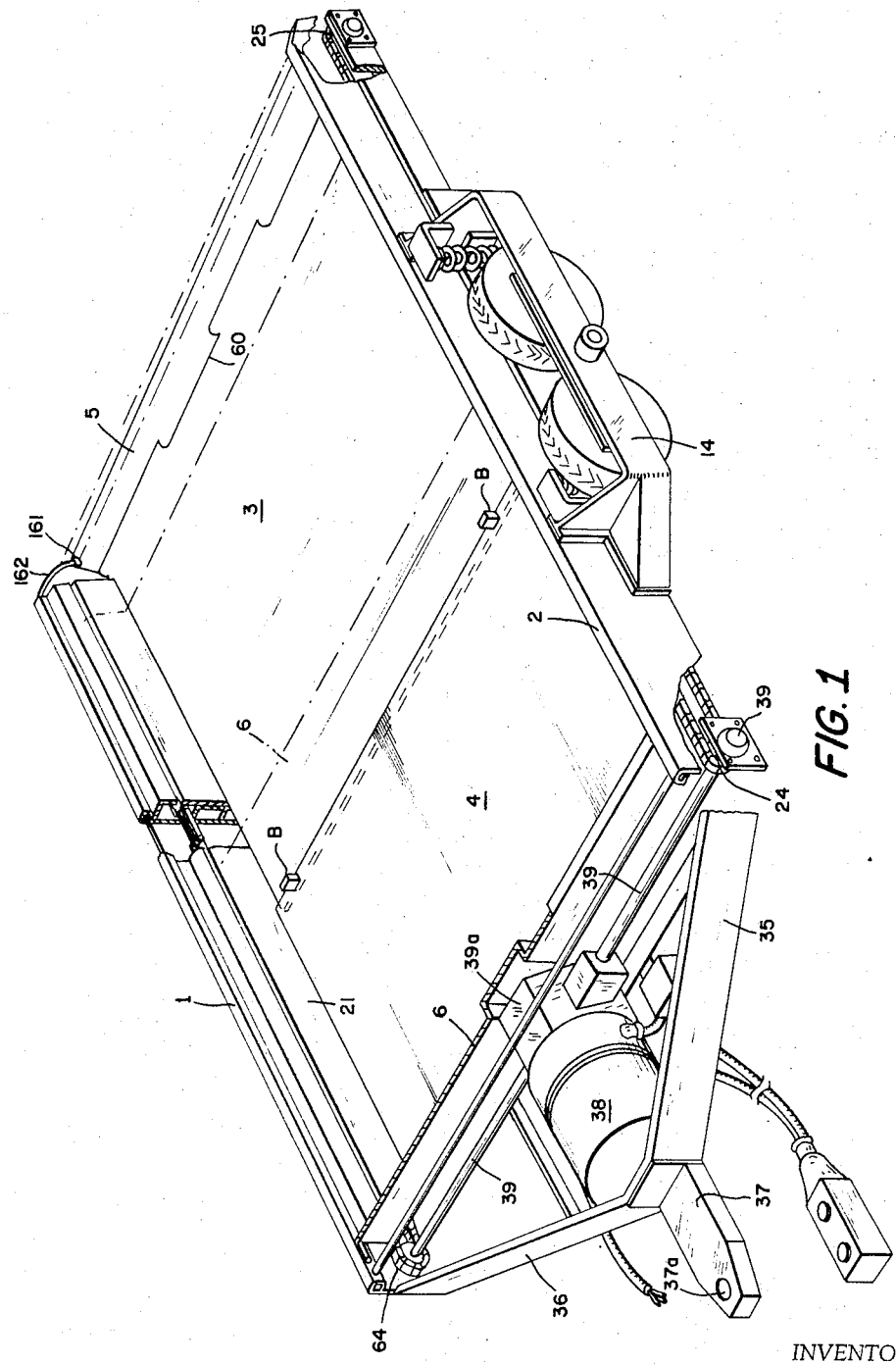
FIG. 1 is a perspective view of the assembly embodying the invention.

Each of the sidewalls 1 and 2 is fabricated, as best shown in FIG. 4, to include a vertical side plate 15 having a lower inwardly projecting flange 16 and an upper inturned flange 17 with a downturned inner edge 18 and outturned flange 18a forming a box structure. Supported on the lower inturned flange 16 and extending from end to end of each sidewall are outwardly and downwardly superimposed angle members 19 and 20, the lower angle member 19 being welded to the sidewall 15 and the inturned flange 16 to provide a rectangular tube for receiving the lower run of the sprocket chain S, while the upper angle member 20 is welded to the sidewall 15 and to the top inner marginal edge of the lower angle member 19 to provide a spacer and a trackway for the upper run of the sprocket chain S. The upper run of the sprocket chain S is confined against lateral displacement by the upturned flange 21 of the floor plate or pan 4. Between the horizontal outwardly projecting top leg of the angle member 20 and the bottom outturned flange 18a of the upper end of the sidewall 15, there is provided a runway extending from end to end of the car and at each side thereof for the travel of the sprocket assembly mounted on the sliding blade 6, the ends of the latter being formed with a configuration providing a snug fit between the end walls of the car and the sliding blade 6. The ends of the sprocket chain S are supported on sprockets 24 and 25 arranged at each end of the car side assemblies, as shown in FIG. 1. The drive for the sprocket chain will be hereinafter described.

A filler or guard assembly, including upright 26 and horizontal plate 27 provides an upper wall for guiding the upper portion of the sprocket assembly during its travel forward and aft under the drive of the sprocket chain and in addition provide a guideway for the cable operating the end gate, as will be hereinafter described.

The sidewall assemblies are connected by transverse end frame member 28 and braces 28a, such as I-beams or the like of suitable strength and proportion, and similarly constructed longitudinal braces 29 are interposed between the transverse braces 28a to provide a horizontal supporting structure upon which are positioned rub plates 31 forming a trackway for the travel of the sliding pan, to be hereinafter more fully described, as well as for directly supporting the pan or movable front section of the floor assembly.

The front end of the car includes two angularly disposed forwardly converging plates 35 and 36 connected at their ends to the respective corners of the bar body at 35a and 36a. A draft bar 37 extends from the car structure medially of its width forwardly and outwardly of the plates 35 and 36. The draft bar 37 is provided with a coupling pin opening 37a for connection with a locomotive and is of sufficient width and suitably connected to the adjacent end of the car to provide a mounting for a power element, such as the electric motor 38 which is adapted to apply power through a transversely extending drive shaft 39 to the front sprockets 24 which are fixedly mounted on the drive shaft 39. A suitable reduction gear in the form of a worm gear may be provided in the housing 39a to apply suitable power to the drive shaft 39, whereby the end sprockets will rotate in the same direction and at the same speed to synchronize the movement of the sprocket chains. The motor 38 will receive its power through appropriate switching means carried by a conventional electric locomotive and will be controlled by the operator of the locomotive for starting, stopping and reversing the motor 38 to drive the sprocket chains to predetermined selected positions.

Figure 11:
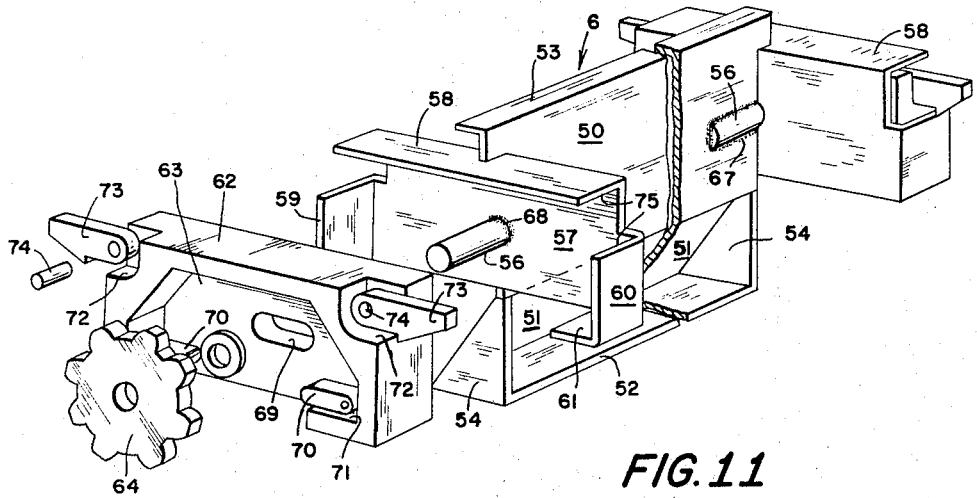
FIG. 11 is an exploded view of the drive unit coupling between the sliding blade and the sprocket chain.

Referring to the front end structure which provides an unloading blade 6 for sweeping the lading from the car floor and further cooperates to position the front sliding deck section 4 of the car floor, reference is made to FIG. 11. The unloading blade 6 which forms the front end wall of the car structure, as well as the unloading mechanism, includes a transversely extending vertical plate section 50, a forwardly and downwardly converging shovel portion 51 which functions to lift the lading in its travel and avoid the packing of the lading, the bottom shoe portion 52 which travels on the surface of the wear plates on the floor of the car, and the top flange 53. The shoe 52, as seen in FIG. 11, is braced with respect to the shovel portion 51 by a plurality of spaced angle braces 54. At each end of the sliding blade 6, heretofore described, are the sprocket units which, through the sprocket chains, form the power means for manipulating the sliding blade across the floor for unloading and returning the same to its front end position to form the front wall of the haulage unit.

Referring to FIG. 11, an exploded view is provided to illustrate the elements of the sprocket units. At each end of the sliding blade 6 there is secured by welding or otherwise, stub shafts 56 which project through the vertical wall 57 of each of the sprocket assembly housings. Each sprocket assembly housing includes the vertical wall 57, which is in operation generally flush with the sidewalls of the car, top wall 58, end walls 59 and 60 and supporting bottom wall sections 61 which project inwardly from each end wall 59 and 60 and provides a supporting surface for the sprocket mounting block 62 which fits within the housing. The sprocket mounting block 62 is formed with an elongated outwardly facing recess 63 in which the sprocket 64 is slidingly positioned. The sprockets are mounted so that they can move freely on their shafts 56. The shaft 56 extends through an opening 68 in the vertical wall 57 of the housing and projects through the elongated slot 69 in the sprocket mounting block 62. The slot 69, through which the shaft 56 projects, is of sufficient length to permit the sprocket mounting block 62 to travel forwardly and rearwardly the length of the slot 69 to facilitate engagement and release of the pivoted pawls or stops 70. The pawls or stops 70 are pivotally mounted in the recesses 63 at each end thereof and when in a horizontal position rest on the inwardly projecting walls 71, which walls 71 provide support to limit the movement of the pawls 70.

At the outer upper corners of the sprocket block 62 recesses 72 are provided and in these recesses 72 are pivoted the latches 73 on the pivot pins 74. The bottom wall of the recesses 72 provides stops to limit the downward movement of the latches 73 and these latches, when the sprocket block 62 is in its housing, project through the recesses formed by cut-away portions 75 at each end of the housing structure so that as the block 62 slides on the stub shaft 56 the latches 73 will project through the recesses in the housing for engagement over the adjacent end wall portions of the end walls 59 and 60 of the housing to form a locking means between the housing and the sprocket block 62 to stabilize the structure.

Referring now to FIGS. 7, 8, 9 and 10, the movement and operation of the sprocket unit assembly will more clearly appear. In the first place, the pawls 70 are so positioned on their pivots and are so shaped that they will function as locks only in certain predetermined positions of the sprocket. Taking for instance FIG. 7, with the sprocket chain S traveling in the direction of the arrow by power from the motor 38 through the drive shaft 39, the block 62 will have shifted to the right which will move the pawl 70 under the tooth 76 of the sprocket so that this sprocket cannot rotate with its stub shaft counter-clockwise in the direction of its arrow. The sprocket, not being permitted to rotate because of the pawl 70, merely forms a lock between the sliding blade 6 to which it is connected through the stub shaft and the sprocket chain S, and the sprocket assembly with the sliding blade 6 will travel in the direction of the sprocket chain until it reaches the discharge end of the lading carrying unit.

At the discharge end of the lading carrying unit there are provided, in each of the end walls, latch actuating members 77 (FIG. 8) provided with recesses 78, the latter being defined in part by inclined faces 79. At the end of the travel toward the discharge end of the haulage unit, the latch 73 will engage the inclined face 79 and be lifted out of engagement with the end wall 60 of the housing to release the connection of the sprocket block 62 and the housing and permit the sprocket block 62 to slide to the limit of the length of the slot 69 and carry with it the pawl 70. This will disengage the pawl 70 from contact with the sprocket tooth 76 and permit the sprocket to rotate freely and therefore no longer travel with the sprocket chain. The right-hand pawl 70 will swing freely as the teeth 76 rotate counterclockwise in FIG. 8. The rotation of the freely turning sprocket 64 against the freely swinging pawl 70 will result in intermittent sound which is used by an operator as an indicator of a freely turning sprocket out of engagement with its pawl. The shifting of the sprocket block 62 in the housing will result in the opposite latch 73 falling to a position engaging the opposite wall 59 of the housing so that the block 62 and the housing will be locked together for simultaneous movement.

Figure 7:
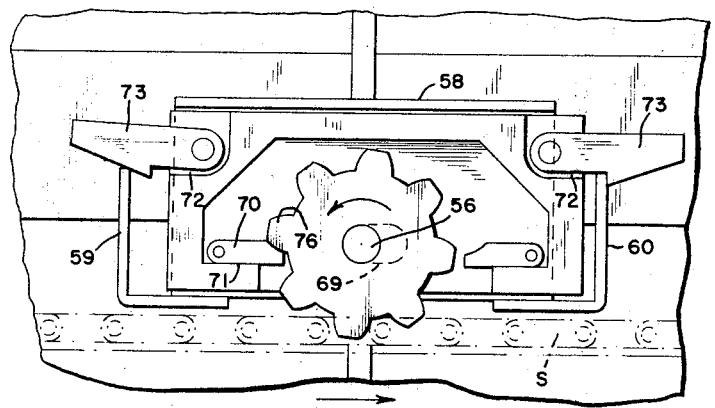
FIG. 7 is a fragmentary elevation showing the sprocket drive assembly in operating position with the sliding blade moving to a lading-discharge position.
Figure 8:
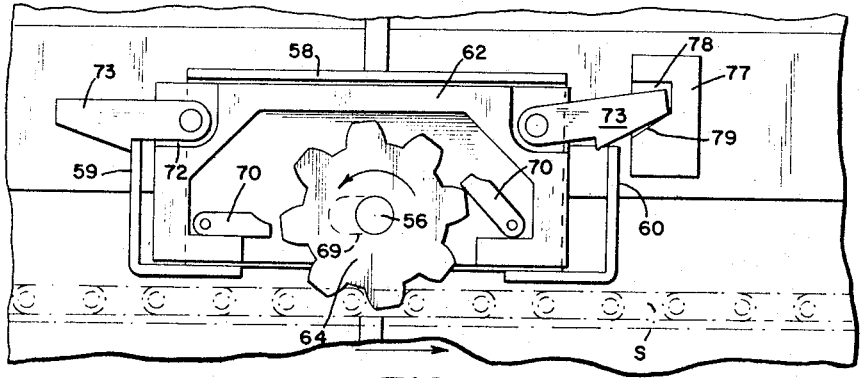
FIG. 8 is a view similar to FIG. 7 in which the sprocket is in unlocked position for free rotation with the sliding blade in stationary position.
Figure 9:
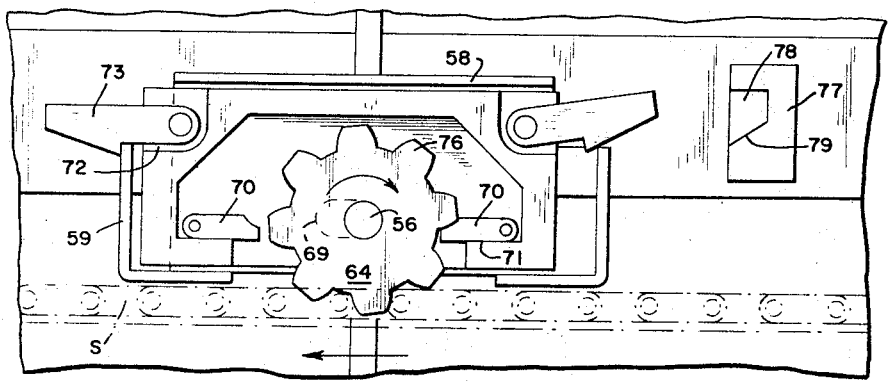
FIG. 9 is a view similar to FIG. 7 in which the sprocket is locked for travel to its front position.
Figure 10:
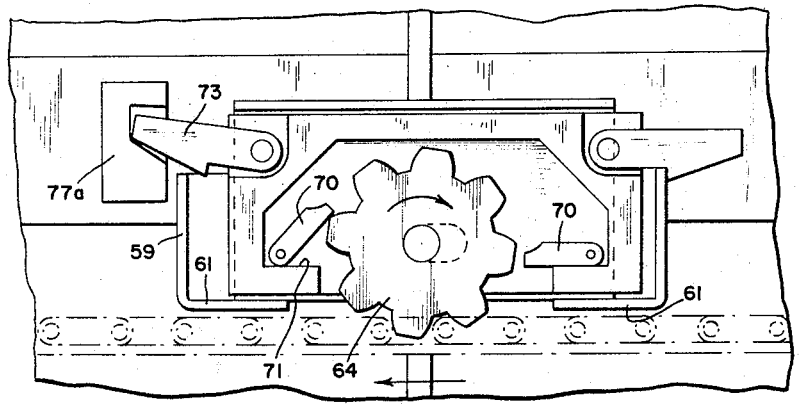
FIG. 10 is a view similar to FIG. 7 with the sprocket assembly in neutral position with the sliding blade at its stationary position at the front of the haulage unit.

With the parts in the position shown in FIG. 8, the operator can reverse the motor 38 and cause a travel of the sprocket chain S in a counterclockwise direction, as indicated by the arrow in FIG. 9. This will result in the sprocket 64 turning clockwise as indicated by the arrow on the sprocket and an upper tooth 76 will engage the right-hand pawl 70, which latter will seat against the flat horizontal surface 71 of the block 62 and lock the sprocket against further rotation. The sprocket 64 being locked against rotation, and the sprocket chain S traveling to the left as indicated, will result in the sprocket assembly and the sliding blade 6 to which it is attached traveling to the left with the sprocket chain until it reaches the front end of the lading structure, which latter is provided at an appropriate point with a latch actuating member 77a which will raise the latch 73 upwardly out of engagement with the adjacent upright wall portion 59 and permit the sprocket block 62 to slide to the right freeing the pawl 70 from engagement with the sprocket tooth and permitting it to run free and to engage the opposite pawl 70 to cause it to rattle or make intermittent noise to indicate the free rotation of the sprocket 64 and termination of the travel of the sliding blade 6. This condition of the sprocket unit is clearly illustrated in FIG. 10 and at this point the operation of the sprocket chain S in the reverse direction by a reversal of the motor will again bring about the operation as illustrated in FIG. 7, where the left-hand pawl 70 engages the reversely rotating sprocket tooth 76 and because of the adjacent wall surface 71 locks the sprocket against rotation and allows it to travel with the sprocket chain S to the unloading position at the end of the car.

At the rear end of the car there is provided a hinged gate, shown in FIG. 1, and indicated by reference character 5. This rear gate 5 is hinged to the rear of the car by hinge assembly 160 and is connected at 161 to the end of cable 162, which cable extends lengthwise of the car body and is connected to a lug 163 which projects through a slot 164 in the angular face 26 for engagement with the adjacent vertical face of the unloading blade 6 as the latter moves at the end of its position at the front end of the car. Coil springs 165 are connected to the lug 163 and to the end wall portion of the car, the springs being compressed when the sliding blade hits the lug 163 as the gate 5 is to be in its upper position when the sliding blade is in its position at the front of the car. On the other hand, when the unloading or sliding blade moves forward, the gate is free to fall down to unloading position by virtue of the slot 164 through which the lug 163 extends and the coil spring 165 at the end of each of the cables 162.

By reference to FIGS. 5 and 6, it will be seen that the cables 162 connect each end of the gate with its respective lugs and are housed in the elongated housings formed by the angle 18 and 18a against each of the inner sidewalls 1 and 2. This arrangement protects the cables from the lading and the use of the spring in the cable permits free movement of the gate to its downward position as the lading is moved to the discharge end of the car by the sliding blade 6.

To understand this invention, it is to be noted that after the car is loaded, the unloading occurs by rearward travel of the unloading blade 6 toward the rear end of the car and it is to be noted that this blade 6 has a movement from one end of the car to the other to insure the complete discharge of the lading contained in the car body. It is also to be noted that the first portion of the travel of the sliding blade 6 sweeps from the sliding deck portion 4 of the car floor the lading supported thereon and the second half of the travel of the sliding blade 6 sweeps lading from the fixed rear portion 3 of the car floor or deck.

Figure 2:
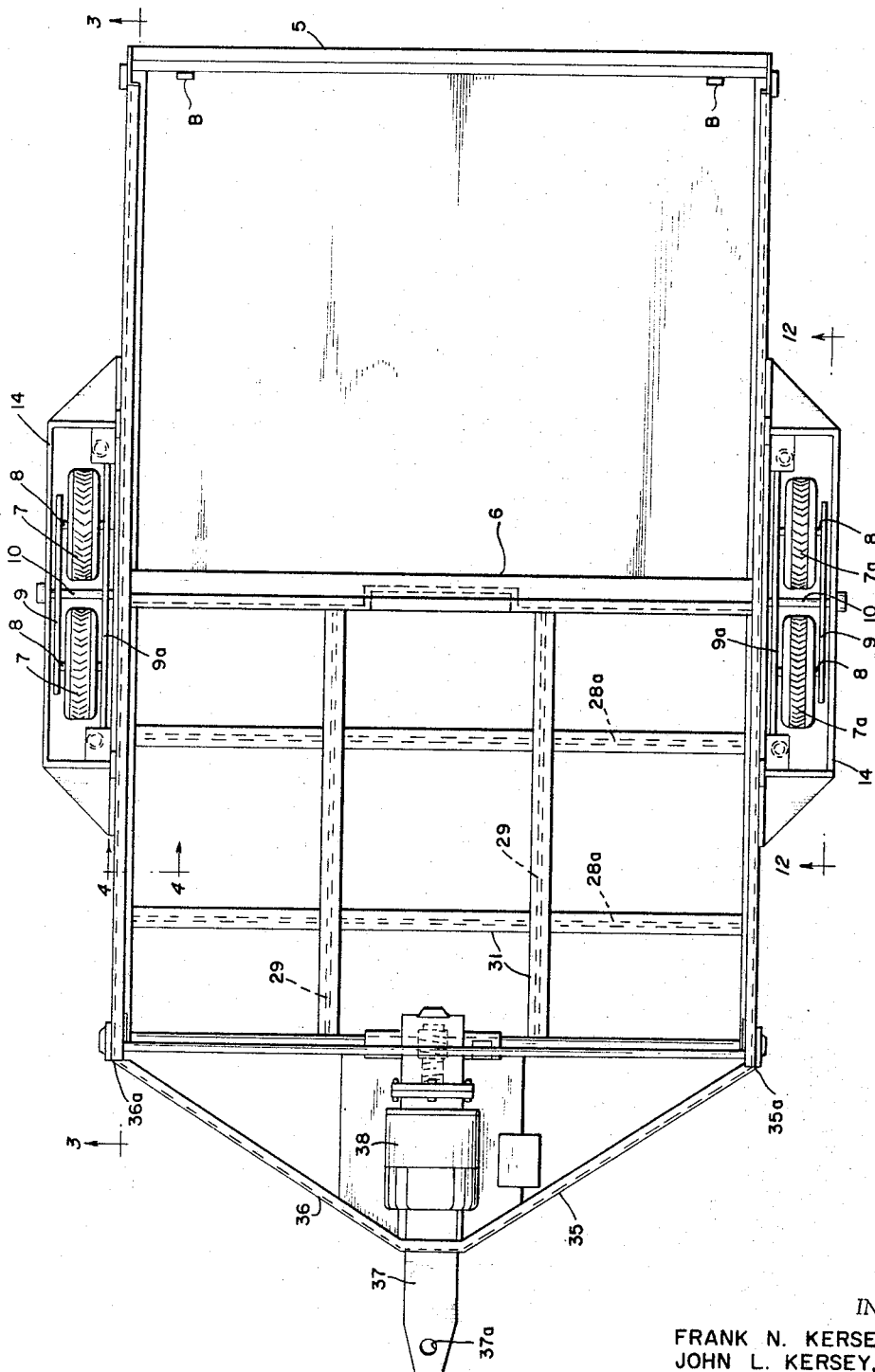
FIG. 2 is a top plan view of the haulage unit constituting the invention and illustrating the sliding floor section in loading position at the rear of the car.

The movement of the traveling unloading blade to the outer extremity of the car body will result in a complete discharge of all lading in the car body including the lading on the traveling deck section and the lading on the fixed deck section and at this position, i.e. with the traveling unloading blade in its furtherest position at the end of the car body, the sliding deck section will have traveled to a position overlying the fixed deck section, as shown in FIG. 2. When in this position, the motor is reversed to cause the chains 26 to move the unloading blade to a medial position and in this position the sliding blade forms the rear wall of the sliding deck section. In this position the sliding deck section can be readily loaded and then further power applied to the sprocket chains will move the sliding blade and the loaded sliding deck section rearwardly to approximately the front end of the car, in which position the fixed deck section will be in a position for loading. Upon complete loading, the end gate is closed by a terminal movement of the unloading blade and the car is ready to travel to any predetermined position.

The theory of operation of the basic concept of this invention is shown in FIG. 13, wherein the first view shows the position of the unloading blade 6 and sliding floor section or pan 4 at the beginning of the loading cycle, i.e. in this position the lading indicated at A has been delivered to the sliding floor section 4 when the latter is at the rear of the car. By loading the rear section of the car when the sliding floor section 4 is at the rear of the car body the lading can be readily discharged on the floor section 4 and held by this floor section by virtue of the sidewalls of the car and the unloading blade 6 which forms the front wall of this car section. Obviously the loading can be by any of the conventional loading devices and without the necessity of long-armed special loading equipment.

When the sliding floor section 4 has been provided with the lading A, the floor section and the unloading blade 6 are moved to approximately the front end of the car body, as shown in the second of the diagrammatic views, and when in this position the lading B can be conveniently delivered to the rear portion of the car and onto the fixed floor section 3 of the car body. This provides a complete loading of the car or other vehicle using this concept and when the car is entirely loaded, a slight movement of the sprocket chains will cause the unloading blade to move against the pin or projection 163 which will elevate the end gate 5 at the outer end of the car or vehicle body. This will result in a four-walled vehicle so that the same can be transported without the loss of the lading.

After the car or vehicle body has been moved to a position for unloading, the unloading blade 6 will be operated by the motor 38 and will start to move from the front end of the car towards the rear of the car carrying before it the lading which will travel freely due to the novel shape of the blade 6 with its angularly projecting face 51 which normally may be positioned at approximately seventy degrees, whereby the lading will be lifted and agitated rather than compacted as it moves toward the discharge end of the car. The rearward movement of the unloading blade will release the lug 163 on the cable 162 and permit the rear gate 5 to lower to its discharge position, freeing the lading in the car for discharge thereover.

At approximately the midway point of travel of the unloading blade, the unloading blade 6 will engage with projections B on the sliding floor section which will then travel with the unloading blade so that at the end of the travel of the unloading blade, the sliding floor section and the unloading blade will be in the position shown in the third view of FIG. 13. In this position the unloading blade, having moved the full length of the car, will have discharged all of the lading from the car body and from off both the sliding floor section 4 and the fixed floor section 3. As previously stated, after the complete unloading operation, the unloading blade 6 will be moved back to form in its mid-position at the front end of the sliding floor section, a front wall therefor and this section can then be loaded, as shown in the first view of FIG. 13.

The further operation has been described, whereby when the sliding floor section is loaded, it is then shifted to the front of the car with the unloading blade 6 and the rear fixed floor section 3 is then loaded and the tail gate 5 moved to upright position.

It is to be understood that the operation of the sliding floor section 4, illustrated diagrammatically in FIG. 13, is associated with the mechanism carried at the end of the unloading blade 6 and this mechanism is automatic in its operation and is actuated by the sprocket chains S which form the power for moving the sliding floor section 4 and the unloading blade 6. The mechanism at each end of the unloading blade comprehends the rotatable sprocket wheels 64, the teeth of which normally engage with the power driven endless sprocket chains S and the travel of the unloading blade 6 with the sprocket chains S occurs when the sprocket wheels are locked against rotation. The locking of the sprocket wheels 64 occurs by the shifting of the block 62 which carries the pivoted pawls 70, the pawls being brought into engagement with the opposite faces of the sprocket wheels at each end of the travel of the assembly. Obviously, when the direction of travel of the sprocket chains S reverses, the rotation of the sprocket wheels reverses and thus the oppositely arranged pawls 70 will function to stop the rotation in either direction and connect the sprocket wheel 64 with the sprocket chains S to cause the sprocket chains and sprocket wheels to travel together.

In the present disclosure this operation is facilitated by the use of the latches 73 which coact with the latch actuating members 77 and 77a fixed at each end of each of the sidewalls of the haulage unit. The latches 73 are fixed to the block 62 carrying the pawls 70 and when the latch actuating members are engaged by the latches 73, the block 62 is automatically shifted to move the pawls 70 at each side of the sprocket wheels so that the appropriate pawls will be positioned to engage the sprocket wheels as the direction of rotation of the sprocket wheels reverses. The sprocket wheels 64, being carried by the unloading blade 6, and the unloading blade having driving connection with the sliding floor section 4, it will be apparent that the reversal of the direction of movement of the sprocket chains from the power source will automatically unload the haulage unit and shift the sliding floor section 4 to a position to facilitate the loading of the sliding floor section and its return to the front of the haulage unit.

What we claim is:

1. In a lading carrying car structure including mounting wheels, an underframe carried by the mounting wheels, sidewalls, a supporting structure for power equipment at the front end of the car structure, power means mounted on the supporting structure, a gate hinged at the discharge end of the car structure, a fixed floor section secured to the underframe and extending from sidewall to sidewall, said fixed floor section terminating at its inner end medially of the car length and at its outer end adjacent the hinged gate, a floor section structure slidingly mounted on the underframe at the forward end of the car, an unloading blade extending from sidewall to sidewall and movable from the front of the car to the rear of the car across the car floor for sweeping the lading in said car outward through the discharge end of the car, means actuated by the initial movement of the unloading blade to lower the hinged gate, said unloading blade when in its front position forming the front wall of the car structure, means connecting the power means with said unloading blade for moving the same lengthwise of the car and for returning the same to its front wall position, means connecting the unloading blade to the slidably mounted floor structure, said last-named means being operable when said unloading blade has reached its medial position lengthwise of the car to move the sliding floor structure to a position above and upon the fixed floor section when the unloading blade is adjacent the hinged gate, power means for returning the unloading blade to the rear marginal edge of the sliding floor structure when the latter is at its unloading position above the fixed floor section to facilitate the loading of lading onto the sliding floor structure, means for returning the unloading blade and the sliding floor structure to the forward end of the car structure to permit the loading of lading onto the fixed floor section, and means for closing the hinged gate.

2. The structure of claim 1 characterized in that the front portion of the underframe supports wear plates lying in the plane of the fixed floor section whereby the sliding floor section when traveling over the wear plates will move into position flush with the upper surface of the fixed floor section.

3. The structure of claim 1 characterized in that the unloading blade includes a substantially upright upper transverse panel and a lower angular panel inclined rearwardly and upwardly from the car structure to produce a lifting movement of the lading in the car when the unloading plate travels during the unloading operation.

4. The structure of claim 1 characterized in that the means connecting the unloading blade to the slidably mounted floor section includes upwardly projecting portions at the front and rear marginal edges of the slidably mounted floor structure, which upwardly projecting portions engage the front and rear faces of the unloading blade.

5. The structure of claim 1 characterized in that the means actuated by the initial movement of the unloading blade to lower the hinged gate and the means for closing the hinged gate comprises cables fixed to each end of the gate and extending along the sidewalls, the cables being anchored to the sidewalls by connecting springs and having outwardly projecting portions for engaging the unloading blade during its travel.

6. The structure of claim 1 characterized in that the means connecting the power means with the unloading blade for moving the same lengthwise of the car and returning the same to its front wall position comprises endless sprocket chains driven by the power means, the endless sprocket chains extending lengthwise along each of the sidewalls and the unloading blade at its end mounting freely rotating members including teeth which mesh with the sprocket chains, means being provided for locking the freely rotating members against rotation, whereby they are moved together with the unloading gate along the driven endless sprocket chains.

7. The structure of claim 1 characterized in that the means connecting the power means with the unloading blade for moving the same lengthwise of the car and returning the same to its front wall position comprises endless sprocket chains driven by the power means, the endless sprocket chains extending lengthwise along each of the sidewalls and the unloading blade at its end mounting freely rotating members including teeth which mesh with the sprocket chains, means being provided for locking the freely rotating members against roation, whereby they are moved together with the unloading blade along the driven endless sprocket chains, and additional means being provided at each end of each sidewall for unlocking the freely rotating members to permit their free rotation.

8. In a lading carrying car structure including mounting wheels, an underframe carried by the mounting wheels, sidewalls, a supporting structure for power equipment at the front end of the car structure, power means mounted on the supporting structure, a gate hinged at the discharge end of the car structure, a fixed floor section secured to the underframe and extending from sidewall to sidewall, said fixed floor section terminating at its inner end medially of the car length and at its outer end adjacent the hinged gate, a floor section structure slidingly mounted on the underframe at the forward end of the car, an unloading blade extending from sidewall to sidewall and movable from the front of the car to the rear of the car across the car floor for sweeping the lading in said car outward through the discharge end of the car, means actuated by the initial movement of the unloading blade to lower the hinged gate, said unloading blade when in its front position forming the front wall of the car structure, means connecting the power means with said unloading blade for moving the same lengthwise of the car and for returning the same to its front wall position, said last-named means comprising endless sprocket chains mounted along each sidewall and freely rotating sprocket wheels meshing with said endless sprocket chains mounted on the ends of the unloading blade, a housing for each sprocket wheel, a block structure in said housing enclosing each of said sprocket wheels and mounted for limited sliding movement, pawl members carried by the block at each side of said sprocket wheels and alternately engaging same upon sliding movement of said block to lock said sprocket wheels against rotation in both directions, means for limiting the downward movement of said pawl members, said pawl members being so spaced at each side of said sprocket wheel that said sprocket wheel in one position is free of engagement with one or the other of said pawl members, and means for shifting said sliding block to alternately engage and disengage said pawl members located at the end portion of each side wall, whereby said sprocket wheels may rotate freely or be locked against rotation in both clockwise and counterclockwise directions.

9. The structure of claim 8 characterized in that the means mounting the sprocket wheels on the ends of the unloading blade comprises stub shafts mounted at one end in bearings supported at the end portions of the unloading blade, and the housings include upright walls having annular openings through which the stub shafts extend, top, end and bottom walls defining an area supporting the block structure, said block structure being formed with an elongated slot through which the stub shafts extend and support the sprocket wheels, the sprocket wheels being keyed to the outer ends of the stub shafts and forming securing means for retaining the housing and block structure against axial movement on said stub shafts.

10. The structure of claim 9 characterized in that pivoted latches are provided on the ends of the block structure and extend through openings at the ends of the housing, said pivoted latches being adapted to engage latch actuating members fixed to the ends of the sidewalls of the housing to secure the block and housing against relative sliding movement and means mounted at the ends of the sidewalls for disengaging the pivoted latches to permit the block structure to slide in the housing for positioning the pawls for alternate engagement with opposite sides of the sprocket wheels.

11. In a lading carrying structure having mounting means, said structure including a floor and sidewalls, endless sprocket chains extending from end to end of each sidewall, said sprocket chains being mounted for movement in opposite directions, power means for simultaneously driving said sprocket chains in both directions, an unloading blade mounted in said lading carrying structure and extending transversely thereof for movement along said floor from one end portion to the other, the ends of said unloading blade being positioned adjacent said sidewalls, sprocket wheels rotatably mounted upon each end of said unloading blade and adapted for engagement with said sprocket chains, a block structure enclosing each of said sprocket wheels, said block structure being mounted for limited sliding movement, inwardly extending pawl means pivotally supported upon the end portions of said block means and having their extremities adapted to alternately engage each side of the sprocket wheel upon sliding movement of said block structure to prevent the rotation of said sprocket wheels in alternate directions, and means at each end of each sidewall for operatively engaging said block structure to slide the same relative to said sprocket wheels to move the pawl means to alternately engage said sprocket wheels at each side thereof, whereby said sprocket wheels are locked against rotation in a clockwise and counterclockwise direction at alternate ends of the movement of said unloading blade to opposite ends of the lading carrying structure.

12. The structure of claim 11 characterized in that the sprocket wheels are mounted upon stub shafts at each end of the unloading blade and the sliding block structures are provided with slots through which the stub shafts extend, whereby the block structures are slidable on the stub shafts to alternately move the inwardly extending pawl means into engagement with the sprocket wheels.

13. The structure of claim 11 characterized in that the block structure is enclosed in and supported within a housing which is fixed to the unloading blade against lateral movement and means are provided for locking the sliding block structure against sliding movement in the housing to maintain the pawl means in engaging position with the sprocket wheels.

14. The structure of claim 11 characterized in that the inwardly extending pawl means pivotally supported on the end portions of the block means are relatively spaced with respect to the sprocket whels to provide free rotation of the sprocket wheels in one direction when the block structure is in a predetermined position.

15. The structure of claim 11 characterized in that the floor structure is formed in sections with one of the sections slidable lengthwise of the floor structure and provided with portions positioned for engagement with the unloading blade whereby the floor section may be moved by movement of the unloading blade.

16. The structure of claim 11 characterized in that the floor includes a sliding section having upwardly extending portions at its front and rear ends and the unloading blade is positioned between the upwardly extending portions and engages the upwardly extending portions during its travel to move the sliding floor section alternately forwardly and rearwardly.

References Cited

UNITED STATES PATENTS

| | | | |
|---|---|---|---|
| 1,353,229 | 9/1920 | Georgeson | 214—83.24 |
| 1,966,710 | 7/1934 | Claybaker | 214—83.24 |
| 2,091,068 | 8/1937 | Girl | 214—83.24 |
| 2,488,066 | 11/1949 | Reuter et al. | 214—83.24 |
| 2,528,045 | 10/1950 | Engesser | 214—83.24 |

GERALD M. FORLENZA, *Primary Examiner.*

ALBERT J. MAKAY, *Examiner.*